Patented Nov. 4, 1952

2,616,913

UNITED STATES PATENT OFFICE 2,616,913

2-AMINO-4-SULFONAMIDOPHENYLARSENIC ACID AND ITS SODIUM SALT

Jacques Trefouel, Paris, France, assignor to Societe des Usines Chimiques Rhone Poulenc, Paris, France No Drawing. Application October 3, 1951, Serial No. 249,623. In France November 29, 1950

1 Claim. (Cl. 260—442)

This invention relates to arsenical compounds and to the preparation thereof.

It is an object of the invention to provide new arsenical compounds of therapeutic value in both human and veterinary medicine. It is a further object of the invention to provide a method for the production of such compounds.

According to the present invention that is provided the new arsenical compound 2-amino-4-sulphonamido-phenylarsinic acid of the formula:

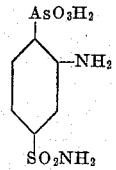

and the sodium salt of said compound. These compounds have been found to be of important therapeutic value particularly as amoebicides.

According to a further feature of this invention the said acid is prepared by subjecting to chemical reduction the compound 2-nitro-4-sulphonamido-phenylarsinic acid. The reducing conditions should, of course, not be such that the arsinic acid group is affected and suitable methods are the treatment of the nitro compound with ferrous hydrate or with hydrogen in the presence of active nickel or again with glucose in aqueous alkaline medium. Where ferrous hydrate is the reducing agent of choice, it may be incorporated with the reaction medium in the form of any water-soluble ferrous salt, such as ferrous sulphate.

The compound 2-nitro-4-sulphonamido-phenylarsinic acid may be synthesised by various routes, one convenient method being as follows: o-nitro-chlorbenzene is treated with chlorsulphonic acid to give 3-nitro-4-chloro-benzenesulphochloride, this product is treated with ammonia at ordinary temperature and pressure yielding 3-nitro-4-chloro-benzenesulphonamide (melting point 174° C.), this sulphonamide is heated with ammonia in a sealed vessel at about 140° C. to yield 3-nitro-4-aminobenzene sulphonamide (melting point 204° C.) and this product is subjected to the well-known Bart reaction to yield 2-nitro-4-sulphonamido-phenylarsinic acid.

The conversion of the 2-amino-4-sulphonamido-phenylarsinic acid to its sodium salt may be effected by any method, e. g. by treating an aqueous solution of the acid with caustic soda and either evaporating to dryness or adding a water-miscible organic solvent in which the sodium salt is at most only slightly soluble, e. g. ethyl alcohol or acetone.

The following examples will serve to illustrate the invention:

Example I

To a solution of 12.7 g. of 3-nitro-4-aminobenzenesulphonamide in 50 c. c. of water and 94 c. c. of normal caustic soda there are added 12 c. c. of a 5N aqueous solution of sodium nitrite. The solution so obtained is poured with vigorous stirring into 50 c. c. of 7.6 N-hydrochloric acid and held at a temperature below 5° C. The diazonium salt so obtained is poured into a solution of 23 g. of sodium arsenite in 50 c. c. of water and 2 c. c. of 5% copper sulphate are added. A precipitate of 2-nitro-4-sulphonamido-phenylarsinic acid (10 g.) is obtained which, after recrystallisation from water, melts at about 220° C.

A solution of 7.8 g. of 2-nitro-4-sulphonamido-phenylarsinic acid in 9 c. c. of water and 5.9 c. c. of caustic soda solution (36° Bé.) is prepared and poured, a little at a time and alternately with 39.2 c. c. caustic soda solution (36° Bé.) into a solution of 46.7 g. of ferrous sulphate in 50 c. c. of water held at about 35° C. This is stirred vigorously, then allowed to remain for half an hour on a boiling water-bath. It is filtered, the filtrate acidified to litmus with hydrochloric acid and cooled in an ice-salt mixture. The sodium sulphate which precipitates is filtered off and the filtrate then concentrated to ⅔ of the original volume. It is acidified with hydrochloric acid until slightly acid to Congo red. The 2-amino-4-sulphonamido-phenylarsinic acid precipitates. On filtration 4.2 g. of product are obtained: a further 1.4 g. is recovered by concentration of the mother-liquors to ⅓ of their volume.

Example II

Into a hydrogenation autoclave there are charged 894 g. of 2-nitro-4-sulphonamido-phenylarsinic acid, 1500 c. c. of 2N caustic soda and 4,500 c. c. of water; active nickel obtained in known manner by the action of alkali on 426 g. of an Al/Ni alloy containing 47% of nickel is added. Hydrogenation is carried out at ordinary temperature for about 1 hour under a pressure of 10 kg./ sq. cm. The nickel is removed by centrifuging, 15 g. of sodium hydrosulphite added with 20 g. of decolourising charcoal and the pH is adjusted to 4.6 by careful addition of hydrochloric acid. The clear liquid obtained after filtration is treated with 250 c. c. of hydrochloric acid (22° Bé.). The 2-amino-4-sulphonamido-phenylarsinic acid crystallises. It is centrifuged, washed and dried under vacuum. 498 g. of product are thus obtained. By concentration of the mother-liquors a further 73 g. are recovered.

*Example III*

145 grams of 2-amino-4-sulphonamido-phenylarsinic acid are dissolved in 700 c. c. of water and 43 c. c. of caustic soda (36° Bé.) with heating on a water-bath. It is treated with 5 g. of charcoal, filtered, and a clear solution obtained which is cooled to 40° C. Into this solution three litres of acetone are poured. It is stirred for ½-hour while cooling to 15° C. The precipitate is removed by centrifuging, washed with 250 c. c. of acetone containing 20% water and then washed with 250 c. c. of pure acetone. On drying in vacuum there are thus obtained 122 g. of the sodium salt of 2-amino-4-sulphonamido-phenylarsinic acid.

I claim:

A compound selected from the class consisting of 2-amino-4-sulphonamidophenylarsinic acid and its sodium salt.

JACQUES TREFOUEL.

REFERENCES CITED

The following references are of record in the file of this patent:

UNITED STATES PATENTS

| Number | Name | Date |
|---|---|---|
| 1,798,030 | Oechlin | Mar. 24, 1931 |

FOREIGN PATENTS

| Number | Country | Date |
|---|---|---|
| 551,627 | France | 1923 |

OTHER REFERENCES

Barber: Jour. of the Chem. Soc. (London), pages 2047–2053—1930.

Oneto: Jour. Am. Chem. Soc., vol. 63, pp. 3068–3070—1941.